US006618153B2

United States Patent
Lin et al.

(10) Patent No.: US 6,618,153 B2
(45) Date of Patent: Sep. 9, 2003

(54) ON-LINE SAGNAC INTERFEROMETRIC DISTRIBUTED FIBER-OPTIC LEAKAGE DETECTION DEVICE

(75) Inventors: Wuu-Wen Lin, Kaohsiung Hsien (TW); Shih-Chu Huang, Kaohsiung (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 09/741,613

(22) Filed: Dec. 19, 2000

(65) Prior Publication Data

US 2002/0041379 A1 Apr. 11, 2002

(51) Int. Cl.[7] .................................................. G01B 9/02
(52) U.S. Cl. ...................................................... 356/483
(58) Field of Search ................................ 356/483, 477, 356/35.5; 250/227.19, 227.27

(56) References Cited

U.S. PATENT DOCUMENTS 5,117,676 A * 6/1992 Chang ....................... 73/40.5 A
5,291,267 A * 3/1994 Sorin et al. ................. 356/479
6,097,486 A * 8/2000 Vakoc et al. ................ 356/477

* cited by examiner

Primary Examiner—Samuel A. Turner
Assistant Examiner—Michael A. Lyons
(74) Attorney, Agent, or Firm—J.C. Patents (57) ABSTRACT

An on-line Sagnac interferometric distributed fiber-optic leakage detection device comprising a light generator, an optical fiber coupler, a hollow pipeline, a Faraday rotator mirror, a sensing optical fiber, a delaying optical fiber, a photo detection device and a spectrum analyzer. Signals resulting from a leaky pipeline are obtained by the linear leakage detection system. The signals are analyzed by the spectrum analyzer to discover any null frequency shift so that exact location of the leakage point along the hollow pipeline can be computed.

5 Claims, 6 Drawing Sheets

ON-LINE SAGNAC INTERFEROMETRIC DISTRIBUTED FIBER-OPTIC LEAKAGE DETECTION DEVICE

BACKGROUND OF THE INVENTION

1. Field of Invention

The present invention relates to a Sagnac interferometric distributed fiber-optic leakage detection device. More particularly, the present invention relates to a linear Sagnac interferometric distributed fiber-optic pipeline leakage detection device.

2. Description of Related Art

In general, oil or natural gas is transferred from place to place via pipelines. When pipelines are used for transferring oil or natural gas, a portion of the pipeline may be buried beneath the ground to prevent damages due to accidents. However, if a particular section of the buried pipeline has a crack and results in some leakage, finding the exact location of leakage is very difficult. Hence, auxiliary equipment must be installed to pinpoint the leaking point.

Figure 1:
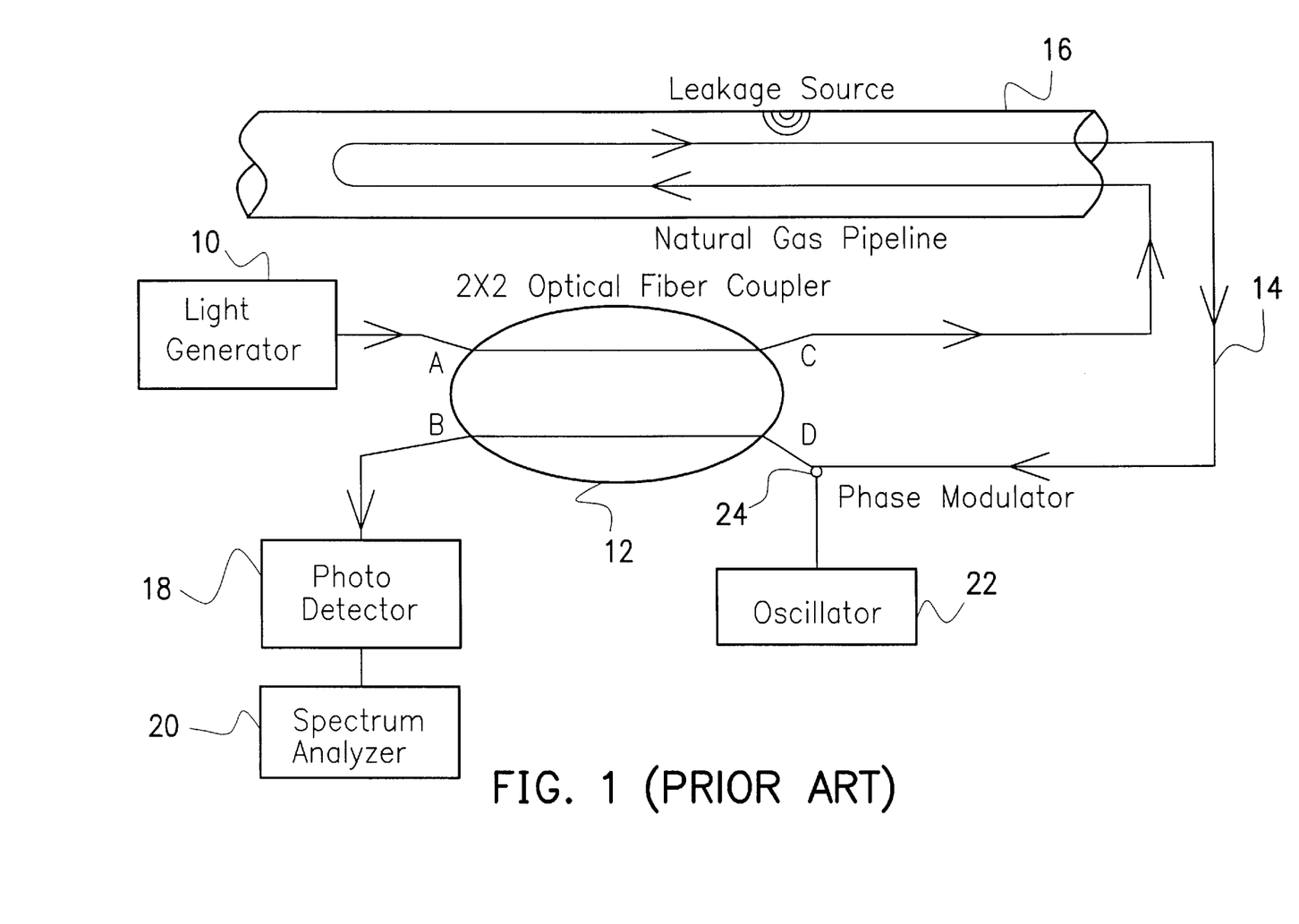
FIG. 1 is a block diagram showing a conventional optical fiber leak detection system.

FIG. 1 is a block diagram showing a conventional optical fiber leak detection system. As shown in FIG. 1, a transmission pipeline 16 is supposed to carry natural gas, for example. A light generator 10 produces a beam of light that enters a 2*2 optical fiber coupler 12 via an inlet at point A. The beam of light passes out from an outlet port at point C and then enters a sensing optical fiber 14. The sensing optical fiber 14 runs along the natural gas pipeline 16 and then loops back to an inlet point D (the sensing optical fiber 14 has a looping architecture) of the 2*2 optical fiber coupler 12. As light passes through the leaky section of the gas pipeline 16 (cracked section), pressure perturbation (an acoustic signal) that initiates at the leakage source results in a phase change of guided light inside the sensing optical fiber 14.

Light returning from sensing optical fiber 14 exits from outlet point B of the 2*2 optical fiber coupler 12 into a photo detection device 18. Photo detection device 18 transforms incoming optical signals into electrical signals and outputs to a spectrum analyzer 20. Spectrum analyzer 20 picks up the electrical signal to assess any frequency shift so that the exact location of leak can be pinpointed.

However, the looping optical fiber has to be installed along a narrow-diameter gas pipeline, and bending in a portion of the optical fiber loop is unavoidable. When light passes along these bends of the sensing optical fiber, a portion of the light beam will be permanently lost (known as bending loss). Furthermore, half of the length of the optical fiber in the sensing loop must be clad by a special material for shielding from unwanted external acoustic fields. Yet, cladding the optical fiber with a special material increases the cost of laying sensing optical fiber along pipeline.

In addition, optical fiber is sensitive to temperature and environmental changes so that the polarization of light passing through an optical fiber may be changed. Hence, a phase modulator (such as the oscillator 22 shown in FIG. 1) serving as a quadrature conditioner is often required to prevent from the polarization induced signal fading problems.

SUMMARY OF THE INVENTION

Accordingly, one object of the present invention is to provide an on-line Sagnac interferometric distributed fiber-optic leakage detection device. The device uses a sensing optical fiber having a linear architecture so that the sensing optical fiber has no bends. Furthermore, a 3*3 optical fiber coupler is used as a beam splitter. Consequently, sensitivity in detecting a leakage point somewhere along an oil or gas pipeline is greatly increased.

To achieve these and other advantages and in accordance with the purpose of the invention, as embodied and broadly described herein, the invention provides an on-line Sagnac interferometric distributed fiber-optic leakage detection device. The device includes a light generator, an optical fiber coupler, a hollow pipeline, a Faraday rotator mirror, a sensing optical fiber, a delay optical fiber, a photo detection device and a spectrum analyzer. The light generator produces a beam of light to the optical fiber coupler. The first optical input/output port of the optical fiber coupler is coupled to the light generator. The optical fiber coupler partitions the input intensity of light going into the first optical input/output port of the coupler into three equal portions. The hollow pipeline is used for transporting liquid or gas. The Faraday rotator mirror mounted at the end of the sensing optical fiber which is installed inside the hollow pipe for compensation of the polarization of the reflected light. The sensing optical fiber is coupled to a second optical input/output port of the optical fiber coupler and the Faraday rotator mirror for transmitting light coming from the second optical input/output port of the optical fiber coupler. The sensing optical fiber transmits light coming from the second optical input/output port of the optical fiber coupler. The delay optical fiber is coupled to the third optical input/output port and the fourth optical input/output port of the optical fiber coupler for transmitting light coming from the third input/output port of the optical fiber coupler. The photo detection device is coupled to the fifth optical input/output port of the optical fiber coupler for receiving light variation signals coming from the fifth optical input/output port of the optical fiber coupler. Light variation signals are converted to electrical signals by the photo detection device. The spectrum analyzer is connected to the photo detection device for receiving and analyzing electrical signals. The sensing optical fiber is a linear structure so that there are no bends for contributing to bending losses.

This invention also provides an on-line Sagnac interferometric distributed fiber-optic leakage detection method. First, a light beam is generated. The beam of light is split into a first sensing light beam and a second sensing light beam. The first sensing light beam follows a first route passing close to any leakage point and then returns to a measuring station. The measuring station registers a first optical field signal given by the formula $$E_I = E_0 \exp\{j[W_c t + \epsilon \Phi \sin \omega_a(t - \tau_1) + \phi_1]\}.$$

The second sensing light beam follows a second route passing close to the leakage point and then returns to the measuring station. The measuring station registers a second optical field signal given by the formula $$E_{II} = E_0 \exp\{j[W_c t + \Delta \Phi \sin \omega_a(t - \tau_2) + \phi_2]\}.$$

When the first light beam and the second light beam is mixed inside the measuring station, an interference signal is generated. The interference optical signal is converted into an electrical current signal. The current signal is given by the formula $$i = \eta I_0 \{\exp[j\{W_c t + \Delta \Phi \sin \omega_a(t - \tau_1) + \phi_1\}] + \exp\{j[W_c t + \Delta \Phi \sin \omega_a(t - \tau_2) + \phi_2]\}\}^2.$$

The current signal is separated out into a direct current signal and an alternating current signal. The direct current signal portion is filtered away so that the residual current signal is proportional to the alternating current signal portion $\cos\{\Delta\Phi[\sin \omega_a(t-\tau_1)-\sin \omega_a(t-\tau_1)]+(\phi_1-\phi_2)\}$. Finally, the alternating signal is simplified. When the modulated frequencies satisfy the condition $$f_a = \frac{\omega_a}{2\pi} = \frac{N}{\tau_d} = \frac{NC}{2n(l-r)},$$

and the output signals become null. At this time, the modulated frequency $f_a$ is called as the null frequency $f_{null}$. Measuring the frequency shift of the null frequencies between absence of leakage and presence of leakage can find the location of the leakage point.

In brief, this invention provides an on-line Sagnac interferometric distributed fiber-optic leakage detection device and method that utilizes linear sensing optical fibers. By using linear sensing optical fibers, losses due to bending are reduced and the sensing optical fibers are more easily fitted inside a narrow pipeline. Furthermore, special cladding material is no longer needed to shield the sensing optical fibers from unwanted acoustic field, thereby reducing material cost for installing the measuring device.

In addition, a conventional leakage detection system uses a 2*2 optical fiber coupler as a beam splitter and so an additional phase modulator is required. This invention uses a 3*3 optical fiber coupler to serve as a beam splitter and an Faraday rotator mirror so that the signal-fading problems due to induced polarization are resolved. Ultimately, sensitivity in detecting the location of a leakage point along any oil or gas pipeline is greatly increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
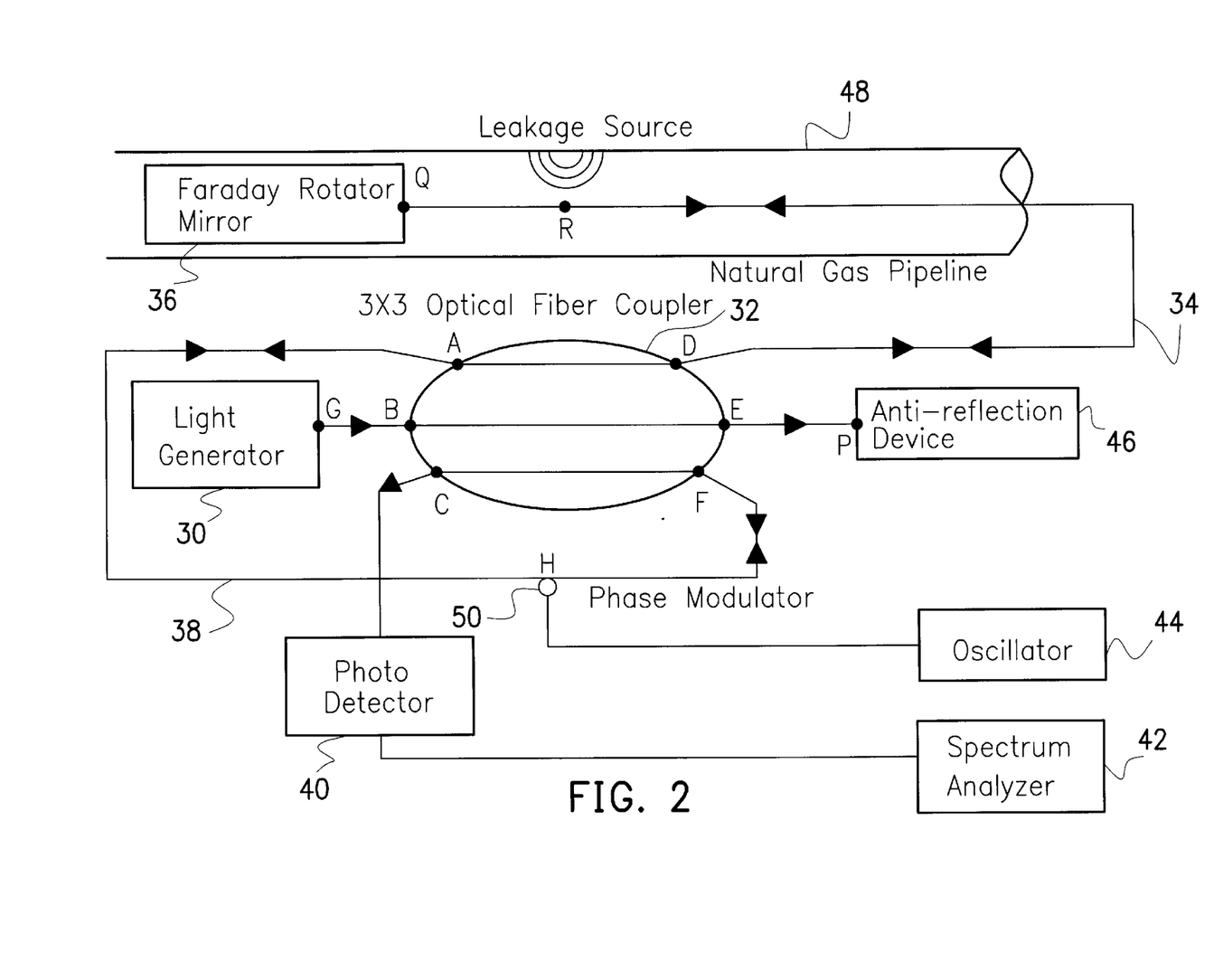
FIG. 2 is a block diagram showing an on-line Sagnac interferometric distributed fiber-optic leakage detection system according to this invention.

FIG. 2 is a block diagram showing an on-line Sagnac interferometric distributed fiber-optic leakage detection system according to this invention. As shown in FIG. 2, the leakage detection system has a light generator 30 that comprises of a super radiant diode and a light isolator. The super radiant diode is used for producing a beam of light. The light isolator prevents any light from reflecting back to the light generator 30 resulting in light interference that can lead to instability of the light source.

A 3*3 optical fiber coupler 32 is the main component of a Sagnac interferometer. The 3*3 optical fiber coupler 32 is used as a beam splitter. Light generator 30 emits a beam of light from a point G to a point B on the 3*3 optical fiber coupler 32. The 3*3 optical fiber coupler 32 splits the incoming beam of light into three equal intensity light beams and then outputs those beams via points D, E and F respectively. The light beam from point E of the 3*3 optical fiber coupler 32 is sent to a point P which is an anti-reflection device 46. Anti-reflection device 46 is capable of receiving light from the 3*3 optical fiber coupler 32 without reflecting any light back to the 3*3 optical fiber coupler 32 that may lead to measurement interference.

A delay optical fiber 38 is coupled to point A and point F of the 3*3 optical fiber coupler 32. Delay optical fiber 38 serves as an optical path. An oscillator 44 drives a phase modulator 50, and is coupled to the delay optical fiber 38. Oscillator 44 is an electric instrument. Modification of a specific frequency and amplitude voltage applied to the phase modulator 50 is capable of shifting the phase of incoming light by an angle of $$\frac{\pi}{2}.$$

One end of a sensing optical fiber 34 is coupled to point D of 3*3 optical fiber coupler 32. The other end of sensing optical fiber 34 is coupled to point Q on a Faraday rotator mirror 36 after passing through a section of natural gas pipeline 48. As an illustration of this embodiment, the sensing optical fiber 34 passes through a natural gas pipeline but can also passes through an oil or water pipeline as well. The sensing optical fiber 34 and the Faraday rotator mirror 36 together serve as a probe of the distributed fiber-optic system for detecting any leakage along the pipeline. The sensing optical fiber 34 is a single mode fiber.

A photo detection device 40 is coupled to point C of the 3*3 optical fiber coupler 32. The photo detection device 40 receives light from the 3*3 optical fiber coupler 32 and transforms any optical signal contained in the light into a current signal. The current signal is submitted to a spectrum analyzer 42. As light beams emitted from points D and F of the 3*3 optical fiber coupler 32 pass close to a leakage point along the natural gas pipeline 48, the beams are modulated by a pressure wave (an acoustic signal) emanating from the leakage source. Hence, a null frequency $f_{null}$ is produced. By analyzing the null frequencies shift within the acoustically modulated (or leakage source perturbed) light beam, spectrum analyzer 42 is able to pinpoint the leakage point along natural gas pipeline 48.

To find the exact location of the leakage source along gas pipeline 48, the leakage detection system must satisfy a number of conditions necessary for optical interference. Hence, a detailed analysis of relevant optical paths is essential.

The light emitted from point G of light generator 30 to point B of the 3*3 optical fiber coupler 32 is split into three beams of equal intensities. First, the beam having one-third the intensities of the beam from the light generator 30 passes from point B to point D of the 3*3 optical fiber coupler 32. The beam emerges from point D of the 3*3 optical fiber coupler 32 into the sensing optical fiber 34. Inside the sensing optical fiber 34, the light beam bypasses a point R (a leakage point along gas pipeline 48) to arrive at point Q on the Faraday rotator mirror 36. Thereafter, the beam is reflected back by the Faraday rotator mirror 36. The reflected light emerges from point Q on the Faraday rotator mirror 36 into the sensing optical fiber 34. The reflected light bypasses point R to arrive at point D of the 3*3 optical fiber coupler 32 again. The reflected light is next transferred from point D to point A inside the 3*3 optical fiber coupler 32. The reflected light emerges from point A of the 3*3 optical fiber coupler 32 into the delay optical fiber 38. After bypassing point H somewhere along the delay optical fiber 38, the reflected light enters the 3*3 optical fiber coupler 32 again via point F and emerges from point C to the photo detection device 40.

Similarly, one third of the light beam entering point B from the light generator 30 is transferred to point F of the 3*3 optical fiber coupler 32. The light beam enters the delay optical fiber 38, re-enters the 3*3 optical fiber coupler 32 at point A and then emerges from the 3*3 optical fiber coupler 32 at point D. The light beam passes from point A of the 3*3 optical fiber coupler 32 into the sensing optical fiber 34. After bypassing point R somewhere along gas pipeline 48, the light is reflected back at point Q of Faraday rotator mirror 36. The reflected light bypasses point R inside the sensing optical fiber 34 and follows the incoming light route to point F and point C of the 3*3 optical fiber coupler 32. Finally, the reflected light enters the photo detection device 40.

Since light entering the 3*3 optical fiber coupler 32 at point B is divided into two beams BD and BF, the two beams come from the same source and hence have identical wavelength (or frequency). Moreover, these two beams pass close to the leakage point on the gas pipeline 48 before returning to the photo detection device 40. Since time differential between the two beams is fixed while the optical path is identical, their phase difference (optical phase difference) is fixed. Hence, this arrangement meets the criteria for forming optical interference.

Figure 3:
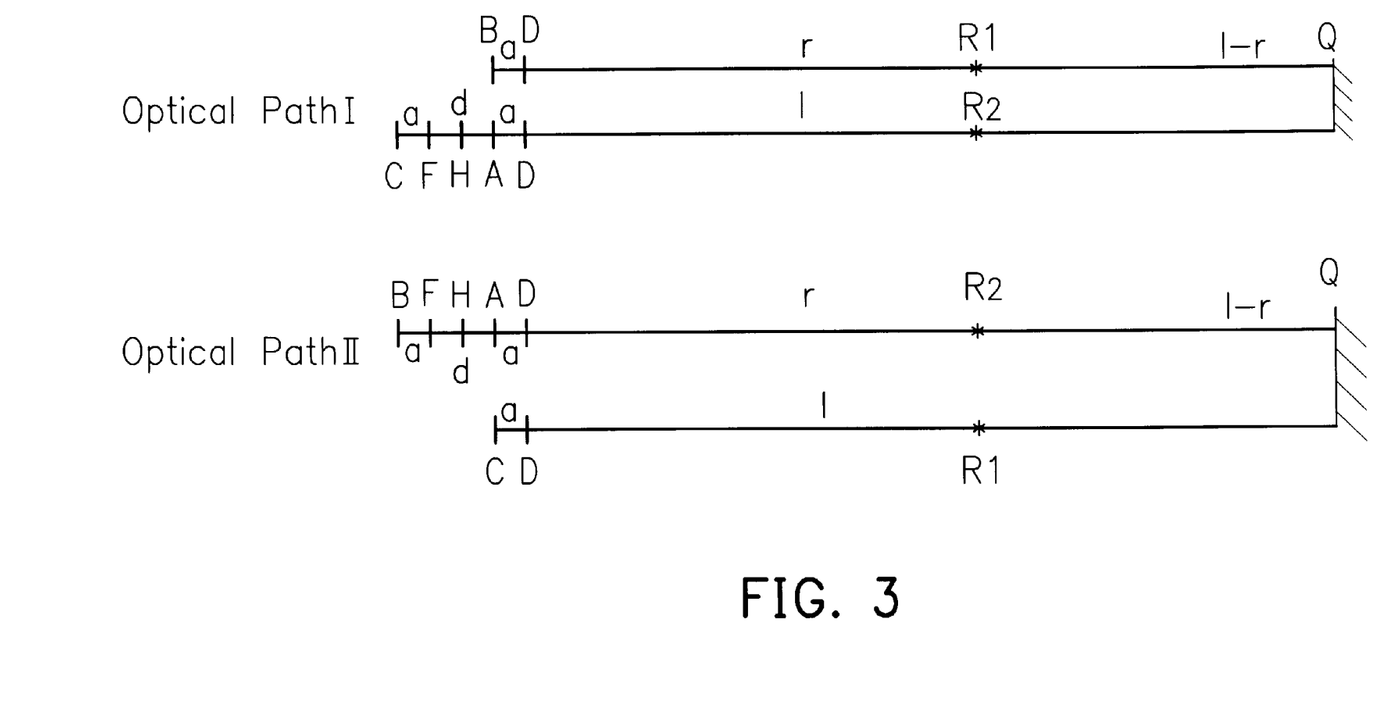
FIG. 3 is a chart showing the optical path of the on-line Sagnac interferometric distributed fiber-optic leakage detection system according to this invention.

FIG. 3 is a chart showing the optical path of the on-line Sagnac interferometric distributed fiber-optic leakage detection system according to this invention. Close observation of the paths taken by the two beams after splitting at point B of the 3*3 optical fiber coupler 32 shows that the two optical routes are identical. As shown in FIG. 3, light in optical path I starts out at point B, then passes through points D, bypasses R, reflects back at point Q, bypasses R again back to point D, then carries on through points A, H, F, and finally arrives at point C. Assume $|BD|=|CF|=|AD|=$length of the optical fiber coupler=a, $|DR|=r$, $|DQ|=l$, $|AF|=d$, the overall length of optical path I equals $3a+2l+d$. Similarly, light in optical path II starts out at point B, then passes through points F, H, A and D, bypasses R, reflects back at point Q, bypasses R again back to point D, and finally returns to point C. The overall length of optical path II equals $3a+2l+d$. Since the overall optical path length of path I and path II are identical, the interferometer so formed can be regarded as an on-line Sagnac interferometer. Light going through optical path I can be regarded as a loop Sagnac interferometer running in a clockwise direction while light going through optical path II can be regarded as a loop Sagnac interferometer running in a counter-clockwise direction.

Because a super radiant diode is used as a light source, the coherent length of the guided light is smaller than 1 mm. Hence, only two light beams having optical path difference smaller than the coherent length can produce interference. In this leakage detection system, the only light beams that meet this condition are those beams that go through optical paths I and II. That is:

Optical path I: GB→BD→DQ→QD→DA→AHF→FC; and

Optical path II: GB→BF→FHA→AD→DQ→QD→DC.

If the optical path is considered as a Sagnac interferometer loop, optical path I is equivalent to a clockwise moving light beam while optical path II is equivalent to a counter-clockwise moving light beam.

In a clockwise direction, light needs to run a total distance of r+a before reaching point R (indicated by $R_1$ in FIG. 3). In the counter-clockwise direction, light needs to run a total distance of $2a+d+2l-r$ before reaching point R (indicated by $R_1$ in FIG. 3). Hence, the difference in distance between the two optical routes is $$(2a+d+2l-r)-(r+a)=2(l-r)+(d+a)\approx 2(l-r).$$

Since l can be several kilometers in length and r is also close to several kilometers in length while d is about a few tens of centimeters and a is about a few centimeters, the values of a and d can be neglected. In brief, time differential between the beams of light traversing each optical path can be given by the formula $$\tau_d = \frac{2(l-r)}{c/n},$$

where c represents the speed of light in a vacuum and n represents the refractive index of the optical fiber core.

Alternatively, light travels in a clockwise direction running a total distance of $a+2l-r$ before reaching point R (indicated by $R_2$ in FIG. 3). In the counter-clockwise direction, light runs a total distance of $2a+d+r$ before reaching point R (indicated by $R_2$ in FIG. 3). Hence, difference in distance between the two optical routes is $$(a+2l-r)-(2a+d+r)=2(l-r)-(d+a)\approx 2(l-r).$$

Hence, time differential between the beams of light traversing each optical path is again given by the formula $$\tau_d = \frac{2(l-r)}{c/n}.$$

Figure 4:
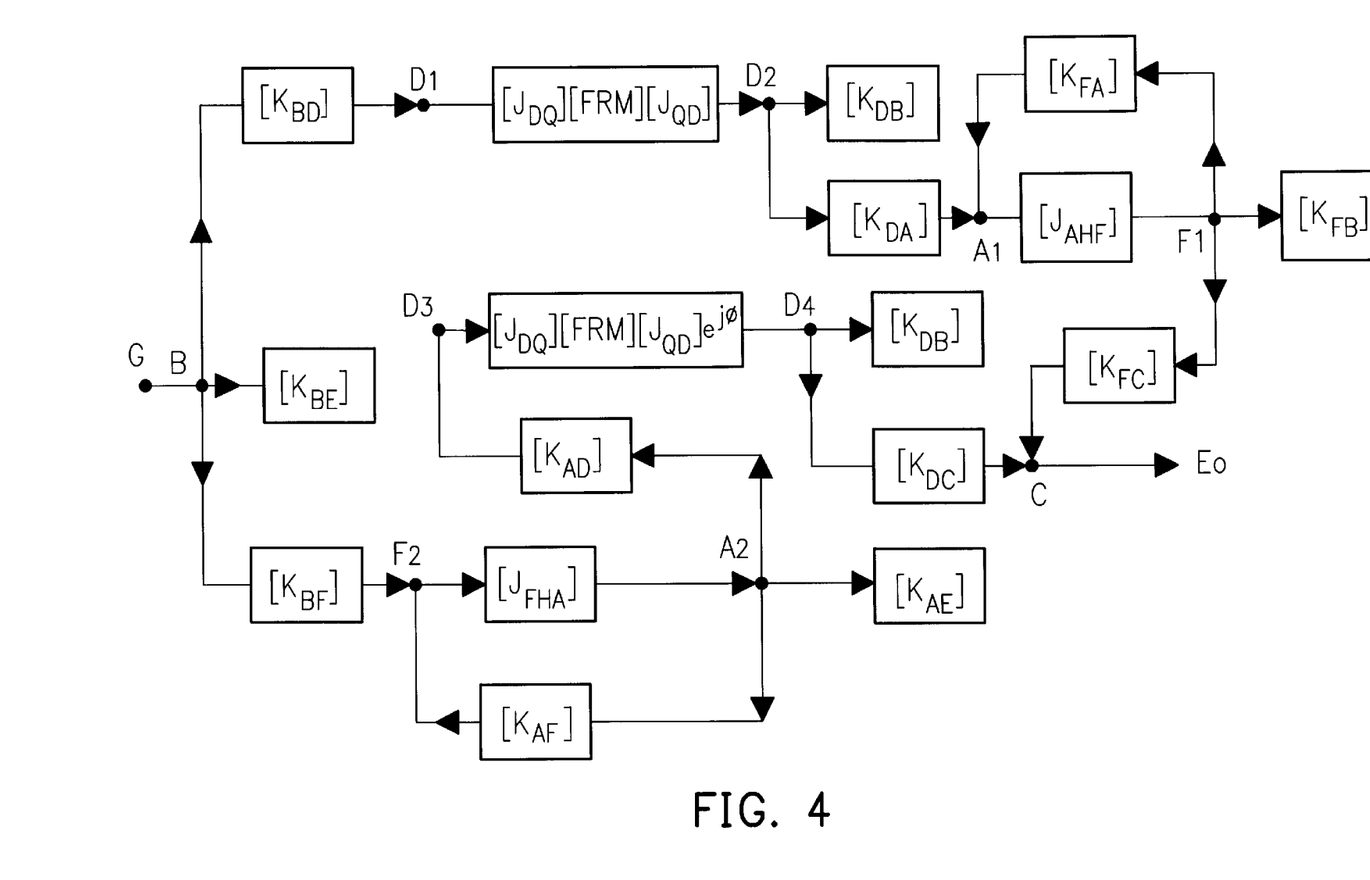
FIG. 4 is a block diagram showing the functional relationship between various elements in the on-line Sagnac interferometric distributed fiber-optic leakage detection system according to this invention.

FIG. 4 is a block diagram showing the functional relationship between various elements in the on-line Sagnac interferometric distributed fiber-optic leakage detection system according to this invention. As shown in FIG. 4, $$I_0 = <E_0^* E_0>$$

is the light intensity input to the photo detection device, where $E_0$ represents the electric field component of the optical signal output by the Sagnac interferometer. According to FIG. 4, $E_0 = [K_{FC}]E_{F1} + [K_{DC}]E_{D4}$, where $[K_{FC}]$ and $[K_{DC}]$ are the respective coupling matrices of the 3*3 optical fiber coupler, $E_{F1}$ and $E_{D4}$ are the respective electric field components of the optical signal at point $F_1$ and point $D_4$.

$E_{F1} = [J_{AHF}]E_{A1}$, where $[J_{AHF}]$ represents the delay matrix of the delay optical fiber AHF.

$$E_{A1} = [K_{FA}]E_{F1} + [K_{DA}]E_{D2}$$
$$= [K_{FA}][J_{AHF}]E_{A1} + [K_{DA}]E_{D2} \Rightarrow E_{A1}$$
$$= \frac{[K_{DA}]}{1 - [K_{FA}][J_{AHF}]}E_{D2}$$

and, $E_{D2} = [J_{DQ}][FRM][J_{QD}]E_{D1} = [J_{DQ}][FRM][J_{QD}][K_{BD}]E_B$, where [FRM] represents the Jones matrix of the Faraday rotator mirror (FRM), $$\Rightarrow E_{F1} = [J_{AHF}]E_{A1} =$$
$$\frac{[J_{AHF}][K_{DA}]}{1 - [K_{FA}][J_{AHF}]}E_{D2} = \frac{[J_{AHF}][K_{DA}][J_{DQ}][FRM][J_{QD}][K_{BD}]}{1 - [K_{FA}][J_{AHF}]}E_B$$

and $E_{D4} = [J_{DQ}][FRM][J_{QD}]e^{j\phi}E_{D3}$, where φ represents the phase delay due to difference in optical path traveled by the second and the first beam of light.

$E_{D3} = [K_{AD}]E_{A2}$ $E_{A2} = [J_{FHA}]E_{F2}$ $$E_{F2} = [K_{BF}]E_B + [K_{AF}]E_{A2} = [K_{BF}]E_B + [K_{AF}][J_{FHA}]E_{F2} \Rightarrow$$
$$E_{F2} = \frac{[K_{BF}]}{1 - [K_{AF}][J_{FHA}]}E_B$$

$$E_{D4} = [J_{DQ}][FRM][J_{QD}]e^{j\phi}E_{D3}$$
$$= [J_{DQ}][FRM][J_{QD}]e^{j\phi}[K_{AD}][E_{A2}]$$
$$= [J_{DQ}][FRM][J_{QD}]e^{j\phi}[K_{AD}][J_{FHA}]E_{F2}$$
$$\Rightarrow E_{D4} = \frac{[J_{DQ}][FRM][J_{QD}]e^{j\phi}[K_{AD}][J_{FHA}][K_{BF}]}{1 - [K_{AF}][J_{FHA}]}E_B$$

$E_0 = [M][R_A E_B + R_B E_B e^{j\phi}]$, wherein the additional multiplication of the [M] matrix is for modifying the output light coordinate so that the output light coordinate is consistent with the input light coordinate, $$R_A = \frac{[K_{FC}][J_{AHF}][K_{DA}][J_{DQ}][FRM][J_{QD}][K_{BD}]}{1 - [K_{FA}][J_{AHF}]}$$

$$R_B = \frac{[K_{DC}][J_{DQ}][FRM][J_{QD}][K_{AD}][J_{FHA}][K_{BF}]}{1 - [K_{AF}][J_{FHA}]}$$

Assume all optical fibers are ideal optical fibers and the 3*3 optical fiber coupler is an ideal element without any polarization, and [I] is a unit matrix, then $[K_{AD}] = [K_{FC}] = [K_{DA}] = [K_{CF}] = \frac{1}{\sqrt{3}}[I]$ $[K_{AF}] = [K_{DC}] = [K_{FA}] = [K_{BD}] = [K_{BF}]$
$= ke^{j\theta}[I] = \frac{1}{\sqrt{3}}e^{j(\pm 120°)}[I]$ $[J_{FHA}] = [J_{AHF}] = [I]$ $[J_{DQ}] = [J_{QD}] = [I]$ $[FRM] = \begin{bmatrix} 0 & -1 \\ -1 & 0 \end{bmatrix}$ $[M] = \begin{bmatrix} -1 & 0 \\ 0 & 1 \end{bmatrix}$ According to the above formulae, $R_A = R_B e^{j(120°)}$. Therefore, output from the interferometer can be written as:

$$I_0 = \langle E_0^* E_0 \rangle =$$
$$\langle R_A^2 + R_B^2 + R_A R_B^* e^{-j\phi} + R_A^* R_B e^{j\phi}\rangle\langle E_B^* E_B\rangle = 2R_B^2[1 + \cos(\varphi - 120°)] \cdot I_i$$

Hence, current signal i from the photo detection device can be written as $i = \gamma \eta I_0 (1 + \alpha \cos \phi)$, where $\gamma = 2R_B^2$ is the loss after a two-way travel inside the 3*3 optical fiber coupler, $I_i = \langle E_B^* E_B \rangle =$ input light intensity, $\eta =$ opto-electric conversion efficiency of the photo detection device and $\alpha =$ interference fringe visibility. Since the above formulae are for the output of a typical interferometer, the leakage detection system used in this invention can be regarded as an optical interferometer system.

Figure 5:
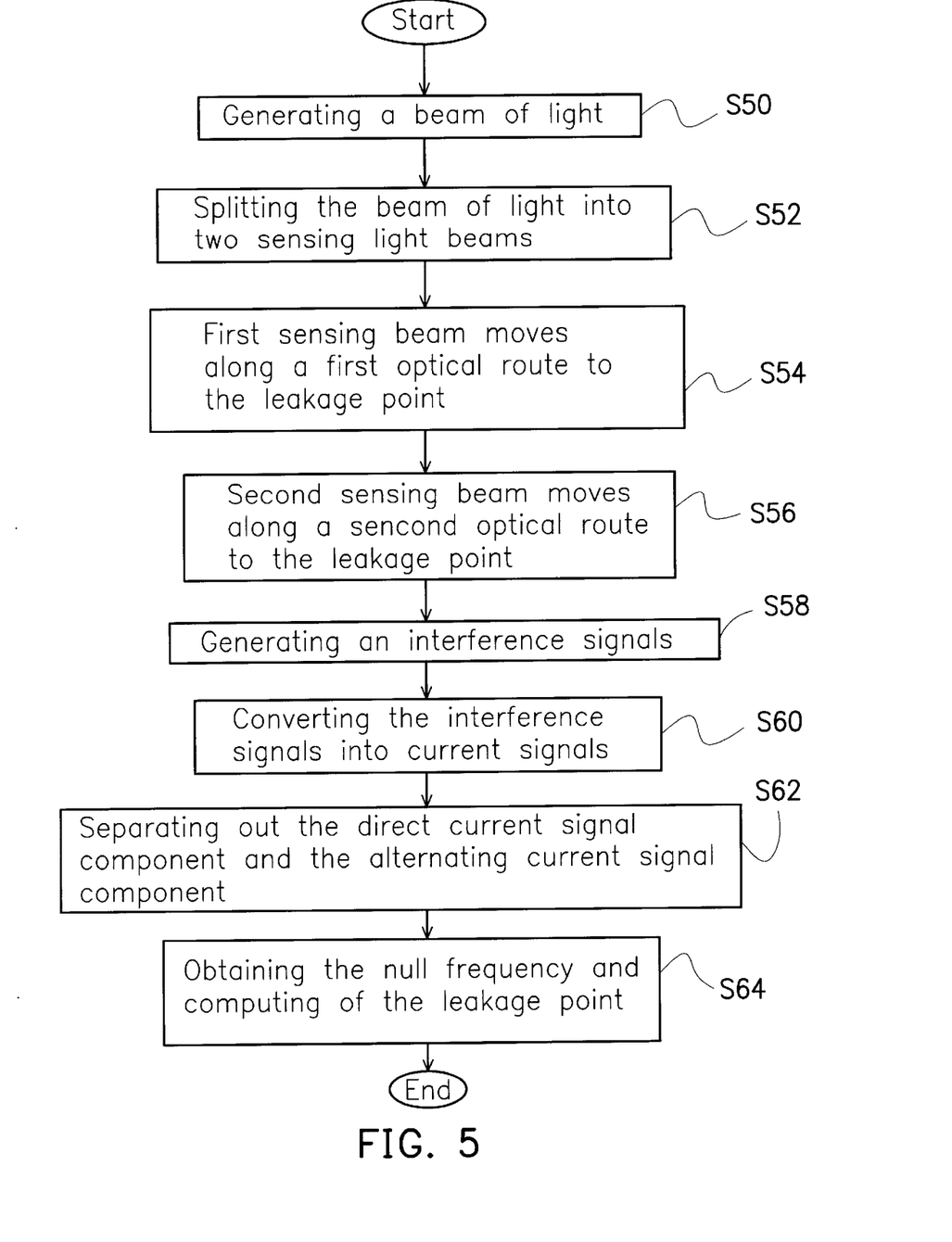
FIG. 5 is a flow chart showing the method of operating the on-line Sagnac interferometric distributed fiber-optic leakage detection system according to this invention.

FIG. 5 is a flow chart showing the method of operating the on-line Sagnac interferometric distributed fiber-optic leakage detection system according to this invention. To find the leakage point along a gas or oil pipeline, light generator 30 as shown in FIG. 3 is used to produce a beam of light (S50). The beam of light is split into two sensing light beams by 3*3 optical fiber coupler 32 (S52). Here, the guided light within the optical fiber is assumed to be $E = E_0 \exp[j(W_c t - \beta x)]$, where E represents electric field component of the optical signal, $W_c$ represents angular frequency of the guided light and β represents the wave number of the guided light.

When there is leakage somewhere along a pipeline due to corrosion or damages by external forces, the high-pressure fluid will squirt out forming a jet. Consequently, the pressure of the surrounding fluid is affected leading to a pressure fluctuation. The fluctuating pressure propagates out in the form of an acoustic wave according to Lighthill theory. Assume the acoustic wave generated by an acoustic source is given by $P = P_0 \sin \omega_a t$, the pressure wave will cause strain variation within the optical fiber and lead to a phase variation of the guided light inside the optical fiber.

Therefore, the measured signal (S54) at point C (refer to FIG. 2) after the first sensing light beam has moved through the first light route, bypassing the leakage point along the way, is given by $$E_I = E_0 \exp\{j[W_c t + \Delta\Phi \sin \omega_a(t-\tau_1) + \phi_1]\},$$

where the first light route is GB→BD→DQ→QD→DA→AHF→FC (as shown in FIG. 3), $E_I$ represents electric field component of the optical signal, $\Delta\Phi$ represents phase variation of guided light due to the acoustic pressure fluctuation inside the pipeline, $\tau_1$ represents the delay time from the acoustic source to the measuring point and $\phi_1$ represents the initial phase of the carrier light wave.

Similarly, the measured signal (S56) at point C (refer to FIG. 2) after the second sensing light beam has moved through the second light route is given by $$E_{II} = E_0 \exp\{j[W_c t + \Delta\Phi \sin \omega_a(t-\tau_2) + \phi_2]\},$$

where the second light route is GB→BF→FHA→AD→DQ→QD→DC (as shown in FIG. 3), $E_{II}$ represents electric field component of the optical signal, $\tau_2$ represents the delay time from the acoustic source to the measuring point and $\phi_2$ represents the initial phase of the carrier light wave.

When the first sensing light beam moving along the path I is combined with the second sensing light beam moving along the path II at point C (refer to FIG. 2), an optical interference will occur. The interference signal (S58) produced by the mutual interference of the first and second sensing light beams is converted into a current signal i(S60) inside the photo detection device 40 (refer to FIG. 2). The current signal i is given by $$i = \eta I_0 \{\exp[j\{W_c t + \Delta\Phi \sin \omega_a(t-\tau_1) + \phi_1\}] + \exp\{j[W_c t + \Delta\Phi \sin \omega_a(t-\tau_2) + \phi_2]\}\}^2,$$

where $\eta$ represents opto-electric conversion efficiency coefficient and $I_0 = \langle E_0^* E_0 \rangle$ represents the intensity of output light.

The current signal includes two direct current signals and two alternating current signals (S62). The direct current signals are filtered away to obtain interferometric signals in proportional to $$\cos\{\Delta\Phi[\sin \omega_a(t-\tau_1) - \sin \omega_a(t-\tau_2)] + (\phi_1 - \phi_2)\}.$$

Under ideal condition, the non-reciprocal phase-shift $\phi_1 - \phi_2$ is a constant. In other words, difference between the initial phase of the carrier wave of the first sensing light beam and the initial phase of the carrier wave of the second sensing light beam is a constant. Hence, the output signal of the above formula can be simplified to $$\cos[2\Delta\Phi \sin\{\omega_a(\tau_1-\tau_2)/2\} \cdot \cos\{\omega_a t - \omega_a(\tau_1+\tau_2)/2\}].$$

By adjusting the driving voltage of oscillator 44 (refer to FIG. 2), a $$\frac{\pi}{2}$$

phase shift is produced so that output from the photo detection device 40 (refer to FIG. 2) is optimized. The output from photo detection device 40 can be represented by $$\sin[2\Delta\Phi \sin\{\omega_a(\tau_1-\tau_2)/2\} \cdot \cos\{\omega_a(\tau_1+\tau_2)/2\}].$$

When $\Delta\Phi \ll 1$, the above formula can be approximated by $$2\Delta\Phi \sin\{\omega_a(\tau_1-\tau_2)/2\} \cdot \cos\{\omega_a t - \omega_a(\tau_1+\tau_2)/2\}.$$

Assume $$\tau_d = \tau_1 - \tau_2 = 2n(l-r)/c, \quad \tau = \tau_1 + \tau_2 \approx 2nl/c,$$

the above formula can be rewritten as $$2\Delta\Phi \sin(\omega_a \tau_d/2) \cdot \cos\{\omega_a(t-\tau/2)\}.$$

According to the formula, the magnitude of the output signal from the leakage detection system is proportional to $2\Delta\Phi \sin(\pi f_a \tau_d)$, where the modulated frequency $f_a = \omega_a/2\pi$. When $\tau_d \ll 1$, the previous formula can be further simplified into $2\Delta\Phi \cdot (\pi f_a \tau_d)$.

According to the above formula, the interferometric signal detected by the photo detection device 40 (refer to FIG. 2) is proportional to the delay differential $\tau_d$ and modulating frequency $f_a$. When $\pi f_a \tau_d = N\pi$ and N is an integer, $$f_a = \frac{N}{\tau_d} = \frac{Nc}{2n(l-r)}.$$

Figure 6:
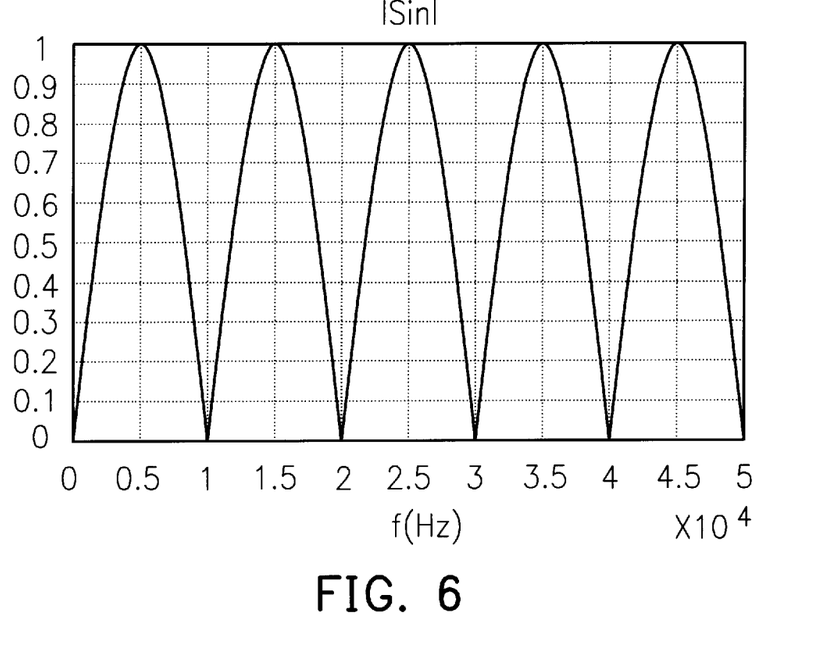
FIG. 6 is a frequency spectrum produced by the on-line Sagnac interferometric distributed fiber-optic leakage detection system of this invention in the absence of pipeline leakage.

FIG. 6 is a frequency spectrum produced by the on-line Sagnac interferometric distributed fiber-optic leakage detection system of this invention in the absence of pipeline leakage. In FIG. 6, supposed the sensing optical fiber has a length l=10 km. When N is an integer, and a null signal is shown in the frequency spectrum, the modulating frequency $f_a$ is called as a null frequency $f_{null}$.

Figure 7:
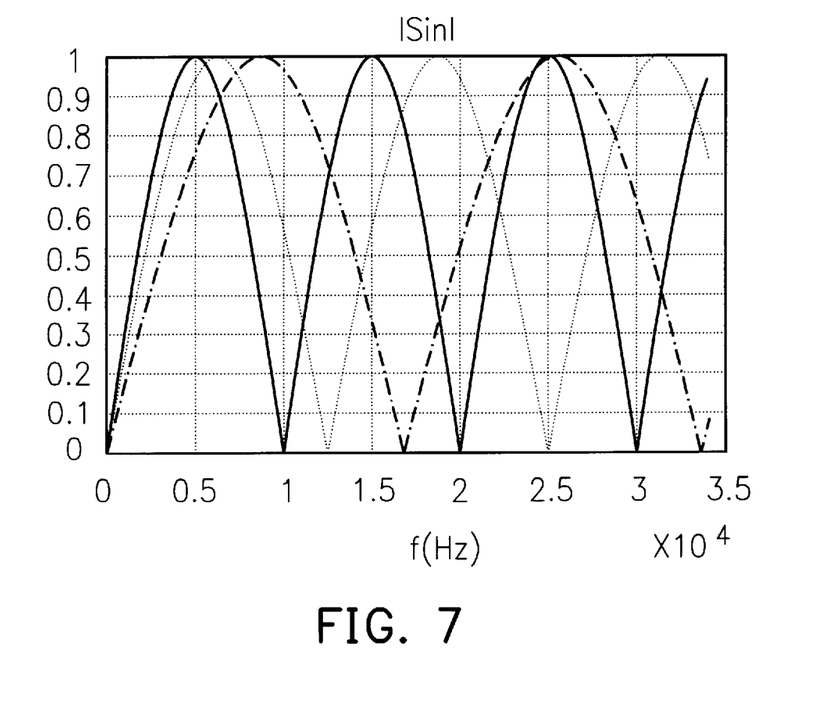
FIG. 7 is a frequency spectrum produced by the on-line Sagnac interferometric distributed fiber-optic leakage detection system of this invention in the presence of pipeline leakage.

FIG. 7 is a frequency spectrum produced by the on-line Sagnac interferometric distributed fiber-optic leakage detection system of this invention in the absence of pipeline leakage and in the presence of two pipeline leakages. The phase modulator 50 (refer to FIG. 2) is adjusted to the optimal bias voltage, that is, the quadrature point. Assume the acoustic signal from the leakage source is white noise, the null frequency is given by $$f_{null} = \frac{N}{\tau_d} = \frac{Nc}{2n(l-r)}$$

with N an integer. As shown in FIG. 7, the magnitude of the null frequency is closely related to the distance to the leakage point. In other words, the null frequency $f_{null}$ is inversely proportional to the size of l-r.

As shown in FIG. 7, the null frequency is $f_{null}=10$ kHz when there is no leakage. If there is a leakage and the leakage point is about 2 km along the pipeline, the null frequency is $f_{null}=12.5$ kHz. In other words, there is a frequency shift of 2.5 kHz in the null frequency. If there is a leakage and the leakage point is about 4 km along the pipeline, the null frequency is $f_{null}=16.7$ kHz. In other words, there is a frequency shift of 6.7 kHz in the null frequency. Therefore, by observing the shift in null frequency in the spectrum analyzer 42 (refer to FIG. 2), the exact leakage point can be computed.

In summary, this invention provides an on-line Sagnac interferometric distributed fiber-optic leakage detection device and method that utilizes linear sensing optical fibers. By using linear sensing optical fibers, losses due to bending are reduced and the sensing optical fibers are more easily fitted inside a narrow pipeline. Furthermore, special cladding material is no longer needed to shield the sensing optical fibers, thereby reducing material cost for installing the measuring device.

In addition, a conventional leakage detection system uses a 2*2 optical fiber coupler as a beam splitter and so an additional phase modulator is required. This invention uses a 3*3 optical fiber coupler to serve as a beam splitter and a Faraday rotator mirror so that the signal-fading problems due to induced polarization are resolved and the leakage detection system becomes a full optical fiber system. Ultimately, sensitivity in detecting the location of a leakage point along any oil or gas pipeline is greatly increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An on-line Sagnac interferometric distributed fiber-optic leakage detection device, comprising:

a light generator for producing a beam of light;

an optical fiber coupler having a first light input/output port coupled to the light generator, wherein the optical fiber coupler splits up the light going from the light generator to the first light input/output port into three equal intensity light beams;

a hollow pipe for transporting a liquid or a gas;

a Faraday rotator mirror installed at an end of a sensing optical fiber installed in the hollow pipe for compensation of the polarization induced signal fading, wherein the sensing optical fiber coupled to a second light input/output port of the optical fiber coupler and the Faraday rotator mirror for transmitting a beam of light to or from the second light input/output port;

a delaying optical fiber coupled to a third light input/output port and a fourth light input/output port of the optical fiber coupler for transmitting light from the third input/output port to the fourth input/output port;

a photo detection device coupled to a fifth light input/output port of the optical fiber coupler for receiving the beam of light emerging from the fifth light input/output port and converting the beam into an electrical signal; and a spectrum analyzer connected to the photo detection device for picking up the electrical signal from the photo detection device;

wherein the sensing optical fiber is a linear element having no bends so that losses due to light bending are greatly reduced.

2. The device of claim 1, wherein the light generator includes a super radiant diode and a light isolator.

3. The device of claim 1, wherein the sensing optical fiber is a single mode optical fiber.

4. The device of claim 1, wherein the optical fiber coupler includes a sixth light input/output port that couples to an anti-reflection device, the anti-reflection device receives light from the sixth light input/output port without reflecting any light back to the sixth light input/output port of the optical fiber coupler.

5. The device of claim 1, wherein the device further includes an oscillator and a phase modulator coupled to the oscillator, and wherein the delaying optical fiber is wound round the phase modulator, and the phase modulator is drived by the oscillator for modulating quadrature point.

* * * * *